Dec. 23, 1930. A. J. BROWN ET AL 1,785,933
DUSTING MACHINE
Filed July 20, 1929
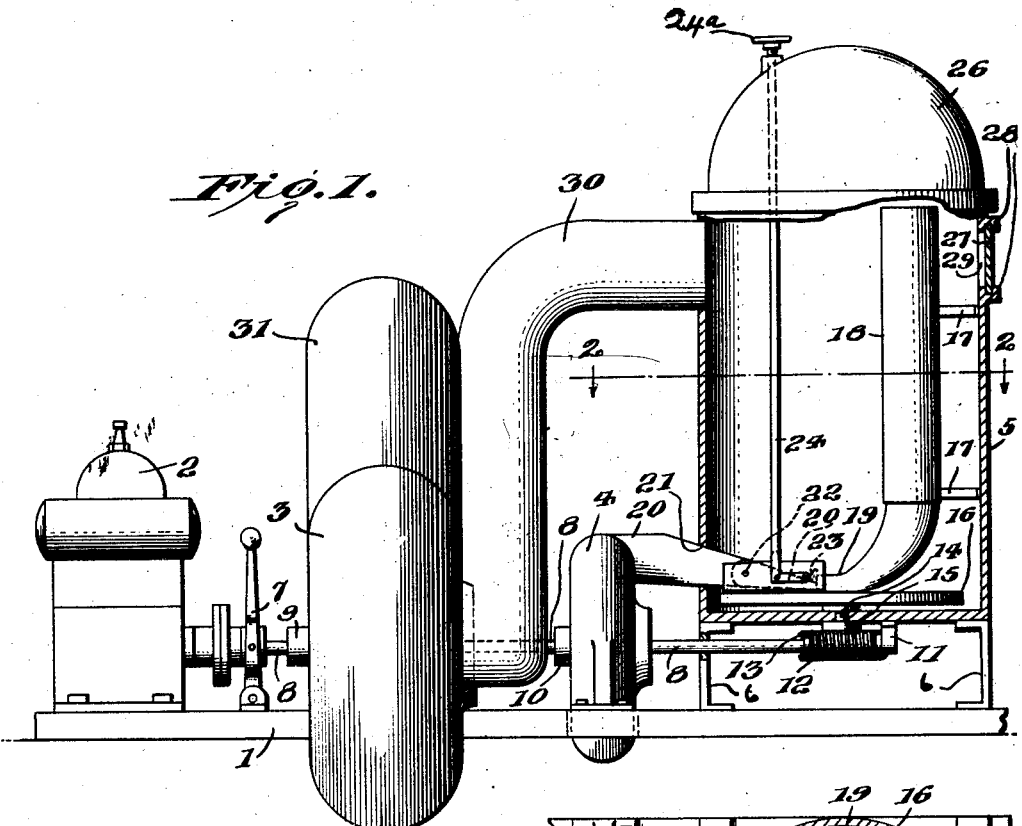
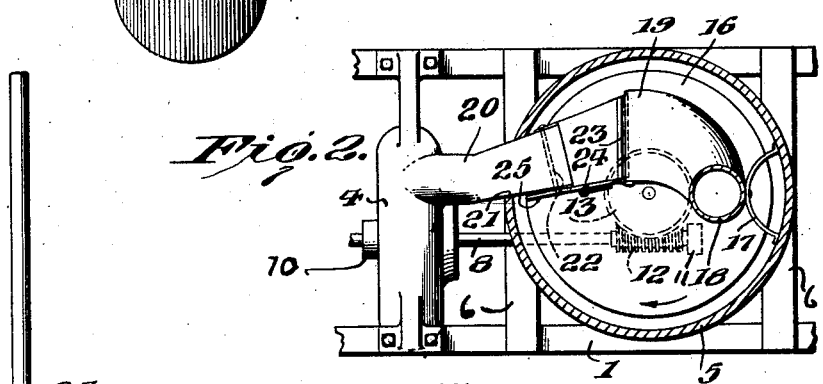
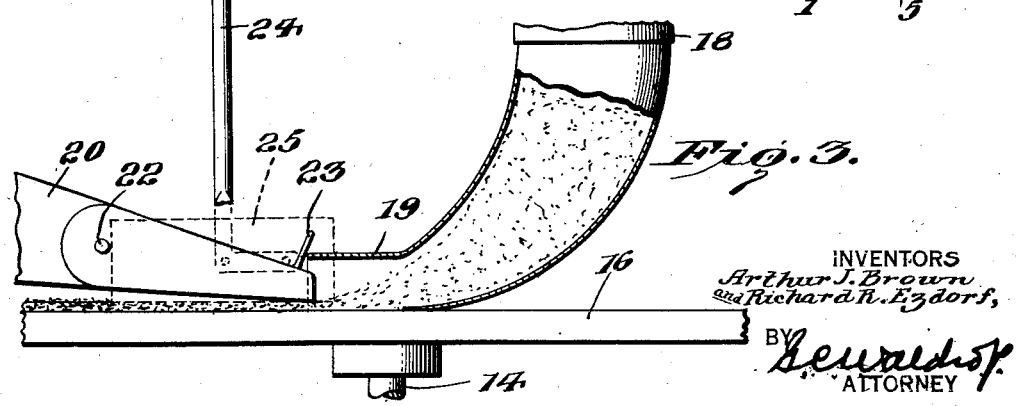
INVENTORS
Arthur J. Brown
and Richard R. Ezdorf,
BY
ATTORNEY Patented Dec. 23, 1930

1,785,933

UNITED STATES PATENT OFFICE

ARTHUR J. BROWN, OF NEW YORK, N. Y., AND RICHARD R. EZDORF, OF WASHINGTON, DISTRICT OF COLUMBIA

DUSTING MACHINE

Application filed July 20, 1929. Serial No. 379,799½.

This invention relates to dusting machines of the broadcast type used in the treatment of vegetation such as fruit trees, vineyards and agricultural crops, etc., infested or likely to become infested with insects or disease.

The invention has for one of its main objects the provision of simple positive and easy-to-operate feeding means whereby a uniform quantity of powder may at all times be discharged from the machine, and more particularly applies to that class of dusting machines as shown in our copending applications, Serial Numbers 337,771 and 337,772, both of which having been filed February 6, 1929.

In our present invention only such parts have been shown in detail as are necessary to fully disclose the essential working parts.

Those skilled in the art may readily understand our invention from the following description together with the accompanying drawings in which Figure I is a side elevation partly in detail;

Figure II is a section on line 2—2 of Figure I;

Figure III is an enlarged detail view of the end of auxiliary fan exhaust and adjacent parts in the bottom of the hopper of Figures I and II.

Like characters indicate similar parts in the several drawings.

Proceeding in accordance with the foregoing, 1 is a framework which may be conveniently supported and transported by an axle and wheels, not shown, or by mounting the framework in or upon a farm wagon, motor truck or the like. The other elements of the invention are superimposed upon this framework.

2 is a motor for supplying necessary power for the operation of the machine and may be of any conventional type, secured to the framework, as by studs or bolts. In like manner fan 3, auxiliary fan 4 and material container or hopper 5—the latter resting upon cross supports 6—6, are secured upon and to the framework 1. A clutch 7 connects the motor 2 to shaft 8 which is rotatably supported by bearing in fan housing 3, and bearing 10 in auxiliary fan housing 4, and by bearing 11 which latter depends from the bottom of the hopper. Upon shaft 8 impellers are mounted to rotate therewith respectively in housings 3 and 4 making of each a conventional fan capable of generating both suction and pressure or exhaust. Upon shaft 8 worm 12 is secured engaging worm wheel 13 which latter is secured to vertical shaft 14 which projects through bearing 15 and the bottom of the hopper and supports at its upper end disk 16 which is secured to and rotates with vertical shaft 14. The position of the disk 16 is sufficiently above the bottom of the hopper to provide space between the disk and the bottom of the hopper for the accommodation of foreign substances, such as stones, loose nuts, etc., which may inadvertently find their way into the hopper. An opening may be provided in the extreme bottom of the hopper, if desired, to facilitate removal of these foreign substances. Brackets 17 secured to the inside wall of hopper 5 support a section of pipe 18 to the lower end of which is secured an apron 19 which is clear of disk 16 so the latter may freely rotate. Apron 19 is open at its lower end thus providing free passage therethrough and through pipe 18 which is open also at its top end permitting passage of powder and air into the upper section of the hopper as will later be more fully described.

Auxiliary fan 4 exhausts through pipe 20 which passes through the side wall of hopper 5 at 21 and terminates directly adjacent the lower extremity of apron 19. Both exhaust pipe 20 and apron 19 are flared out over disk 16 at their adjacent extremities so as to extend substantially from the center to the periphery of the disk 16, although this is so shown as a preferred form of construction the same not being the only form which will function in a satisfactory manner. Exhaust pipe 20 is hinged as at 22 or is provided with a flexible section, or in some other manner provision is made to permit of its raising and lowering so it may be brought away from or nearer to disk 16 as desired. Upon the upper side of exhaust pipe 20 a ledge 23 is fixed which projects upwardly immediately adjacent the upper side of apron 19, which serves to prevent the entrance of powder into the end of apron 19 when the exhaust pipe 20 is manipulated up and down.

The disk 16 revolves in the direction indicated by the arrow of Figure II. Exhaust pipe 20 carries a rake 25 which preferably overlaps both exhaust pipe 20 and apron 19, and is positioned on the side of pipe 20 from which disk 16 in its rotation approaches. Rake 25 and exhaust pipe 20 may be manipulated up and down and secured in any desired position as by rod 24 secured to the rake and projecting upwardly inside the hopper and through supports, not shown, under lid 26 of hopper 5, provision being made for disconnecting the rod 24 or the hand wheel 24a to permit ready removal of lid 26 when desired. In this manner may be regulated the quantity of powder which passes under the rake 25 and after said powder has passed beneath the rake it will receive a blast of air discharged from auxiliary fan 4 through exhaust pipe 20 and thereby be driven upward through pipe 18 into the top of the hopper.

27 is a sliding gate supported by flanges 28—28 which covers opening 29 in hopper 5 by which the amount of air entering the upper section of the hopper may be regulated. 30 is a pipe or conduit leading from the upper section of the hopper 5 to the intake side of fan 3 through which air and powder are drawn and passed through fan 3 and discharged therefrom through exhaust 31.

The operation is as follows:

Lid 26 is removed and the hopper 5 charged with the desired contents of powder, clutch 7 is thrown out, releasing motor 2 from shaft 8. The motor is then started and rake 25 adjusted through hand wheel 24a and rod 24 to provide for the passage thereunder of the desired amount of powder as disk 16 rotates. Clutch 7 is thrown in connecting motor 2 with shaft 8, which starts fans 3 and 4 and through worm 12 and worm wheel 13 disk 16 is rotated. As the powder in hopper 5 rests on disk 16 it is brought around to contact with rake 25 and so much thereof as will pass under rake 25 (according to the position at which the rake is adjusted with respect to disk 16) is engaged by a blast of air from fan 4 as it exhausts through exhaust pipe 20 and is blown by this blast of air through apron 19 and pipe 18 from which latter it is discharged into the upper section of hopper 5 under lid 26. The amount of air drawn through conduit 30 by fan 3 normally is or would be much greater than the amount of air discharged through exhaust pipe 20 by auxiliary fan 4. This is as it should be since it is desired that the powder discharged upwardly by the air through and from pipe 18 have time to release the heavier (by unit) or coarser particles therefrom before the finer particles or dust is drawn off to be discharged by fan 3.

Gate 27 is then adjusted over opening 29 so as to admit the quantity of air into the top of hopper 5 necessary to produce the quiescence desired in the area above the mass of powder in the hopper to effect separation of the heavier and coarser particles from the mixture of powder and air and to supply the requisite amount of air to produce the mixture of air and powder best suited for discharge from fan 3 through exhaust 31 onto or over the area of vegetation being treated.

The coarse and heavy particles dropping down upon top of the mass of powder in hopper 5 from the upper section thereof about the upper end of pipe 18 will eventually find their way downward to disk 16 and be brought again under exhaust pipe 20 and be driven upward through pipe 18 into the upper section of hopper 5 and in this manner will be reduced in great part to the requisite fineness to be drawn through conduit 30 and discharged by fan 3.

Having described our invention so that others skilled in the art may understand and practice the same; what we claim is:

1. In a dusting machine, a powder container, means in the bottom of the container for moving powder in a predetermined plane, fluid means for removing the powder from the upper surface of said first named means, a pipe for conducting the powder and fluid into the upper section of the container and means for extracting the fluid and powder from the container and discharging the same onto the area being treated.

2. In a dusting machine, a powder container, means in the bottom of the container for moving powder in a predetermined plane, means whereby to regulate the quantity of powder moved in said plane, fluid means for removing the powder from the upper surface of said first named means, a pipe for conducting the powder and fluid into the upper section of the container and means for extracting the fluid and powder from the container and discharging the same onto the area being treated.

3. In a dusting machine, a powder container, a rotating disk in the bottom of the container, a conduit projecting from the upper section of the container downward to a point adjacent and above the disk, means for generating a current of air and means for directing said air current into the powder carried on the disk and into and through the conduit, and means for extracting air and powder from the top of the container and discharging the same onto the area of vegetation being treated.

4. In a dusting machine, a powder container, a rotating disk in the bottom of the container, a conduit projecting from the upper section of the container downward to a point adjacent and above the disk, means for generating a current of air and means for directing said air current into the powder carried on the disk and into and through the conduit, means for admitting air into the top of the container, and means for extracting air and powder from the top of the container and discharging the same onto the area of vegetation being treated.

5. In a dusting machine, a powder container, a rotating disk in the bottom of the container, means to regulate the quantity of powder carried by the disk, a conduit projecting from the upper section of the container downward to a point adjacent and above the disk, means for generating a current of air and means for directing said air current into the powder carried on the disk and into and through the conduit, means for admitting air into the top of the container, and means for extracting air and powder from the top of the container and discharging the same onto the area of vegetation being treated.

6. In a dusting machine, a powder container, a rotating disk in the bottom of the container, means to regulate the quanity of powder carried by the disk, a conduit projecting from the upper section of the container downward to a point adjacent and above the disk, means for generating a current of air and means for directing said air current into the powder carried on the disk and into and through the conduit, means for admitting air into the top of the container, means to control the amount of powder entering the conduit, and means for extracting air and powder from the top of the container and discharging the same onto the area of vegetation being treated.

In testimony whereof we affix our signatures.

ARTHUR J. BROWN.
RICHARD R. EZDORF.